United States Patent [19]

Workman, Jr.

[11] 4,090,688
[45] May 23, 1978

[54] LOW PRESSURE SHUTOFF VALVE FOR FLUID OPERATED TOOL

[75] Inventor: William Workman, Jr., Spring Lake, Mich.

[73] Assignee: Gardner-Denver Company, Dallas, Tex.

[21] Appl. No.: 707,476

[22] Filed: Jul. 21, 1976

Related U.S. Application Data

[63] Continuation-in-part of Ser. No. 661,886, Feb. 27, 1976, abandoned.

[51] Int. Cl.² .................................... F16K 31/143
[52] U.S. Cl. ......................... 251/25; 251/44; 137/466
[58] Field of Search ..................... 251/44, 35, 25; 137/508, 466

[56] References Cited

U.S. PATENT DOCUMENTS

| | | | |
|---|---|---|---|
| 2,537,051 | 1/1951 | Grant, Jr. | 251/25 |
| 2,799,466 | 7/1957 | Hickerson | 251/14 X |
| 2,814,307 | 11/1957 | Hafele et al. | 251/25 X |
| 2,996,074 | 8/1961 | Page et al. | 251/25 X |
| 3,860,073 | 1/1975 | Willms | 251/43 X |

*Primary Examiner*—Arnold Rosenthal
*Attorney, Agent, or Firm*—Michael E. Martin

[57] ABSTRACT

A low pressure shutoff valve adapted to be interposed in the fluid supply conduit of a fluid operated torque tool comprises a piston closure member having opposed differential pressure faces exposed to fluid supply pressure and a coil spring for biasing the piston toward a fluid shutoff position. The piston is disposed in a chamber which may be vented by actuating an axially slidable sleeve on the exterior of the valve body whereby the valve is opened to supply pressure fluid to the tool as long as the fluid pressure is greater than a predetermined minimum value.

8 Claims, 5 Drawing Figures

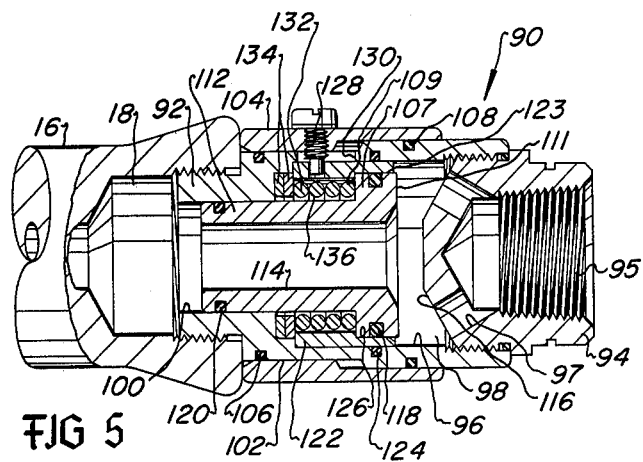
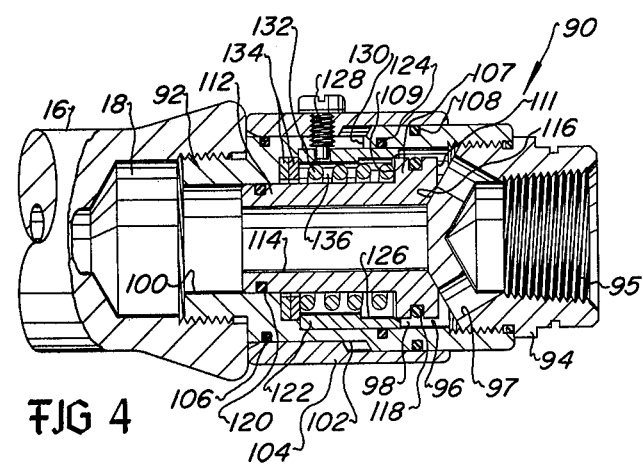

LOW PRESSURE SHUTOFF VALVE FOR FLUID OPERATED TOOL

BACKGROUND OF THE INVENTION

This application is a continuation-in-part of applicant's prior copending application Ser. No. 661,886 filed Feb. 27, 1976 and now abandoned.

In the art of pneumatic tools for tightening threaded fasteners and the like it is known to provide control devices for shutting off the supply of motive fluid, such as compressed air, to the tool motor when a predetermined reaction torque or a signal related to torque output is sensed in the tool proper. The apparatus disclosed in U.S. Pat. No. 2,964,151 to R. E. Eckman and 3,373,824 to H. L. Whitehouse are exemplary of devices which sense reaction torque on the tool drive mechanism and a change in fluid pressure to the tool motor, respectively, for operating devices to shut off motive fluid to the tool motor when a predetermined torque is developed by the tool. However, if the motive fluid supply pressure at the tool is insufficient to develop the motor torque which will result in motor shutoff, the tool will still continue to develop a torque effort which must be opposed by the tool operator. If the tool motor shutoff mechanism fails to function properly, the tool operator may sustain injury from the unceasing reaction torque imposed by the tool or at least the operator will become quickly fatigued from handling the tool in repeated operations in which the reaction torque is only relieved by release of the tool starting mechanism.

Moreover, in many applications of torque tools a specified final torque value must be applied to the fastener to assure that the fastener will not become loose in service. Accordingly, if the motive fluid supply pressure to the tool proper is insufficient to cause the tool to develop the torque value which will automatically shut off the motor then, of course, the fasteners or the like will not be tightened to the specified torque which will provide for their acceptable performance.

U.S. Pat. No. 3,480,087 discloses a pressure indicator device which will provide a visual signal when a pressure condition less than a predetermined minimum is present in the tool supply conduit. Such a device requires the visual attention of the tool operator, however, and will not automatically render the tool inoperative if the fluid supply pressure decreases below a predetermined minimum.

SUMMARY OF THE INVENTION

The present invention provides a shutoff valve operable to automatically shut off the pressure fluid supply to a fluid operated tool or the like when the supply fluid pressure decreases below a predetermined minimum. The shutoff valve of the present invention is particularly adapted to be used with pneumatic torque tools for tightening threaded fasteners and the like and is adapted to be interposed between the inlet passage in the tool proper and the motive fluid supply conduit.

The shutoff valve of the present invention is further characterized by an actuating member for opening the valve by the tool operator person after the supply conduit is connected to the tool or the motive fluid is introduced into the conduit prior to commencing operation of the tool. The actuating member is also provided so as to require that the tool operator reopen the shutoff valve after actuation of the valve closure member to close due to the pressure in the fluid supply conduit decreasing below a predetermined minimum value.

In accordance with the present invention there is provided a minimum pressure shutoff valve for fluid operated tools which is adapted to substantially prevent malfunction of torque resposive motor shutoff mechanisms in the tool proper due to insufficient motive fluid supply pressure.

The low pressure shutoff valve of the present invention is compact in design and is adapted to be used with many different types of tools without increasing the bulk of the tool or impairing the handling qualities thereof.

BRIEF DESCRIPTION OF THE DRAWINGS

FIG. 4 is a longitudinal section view of an alternate embodiment of the shutoff valve of the present invention; and, FIG. 5 is a view similar to FIG. 4 showing the valve in the open position.

DESCRIPTION OF THE PREFERRED EMBODIMENTS

Figure 1:
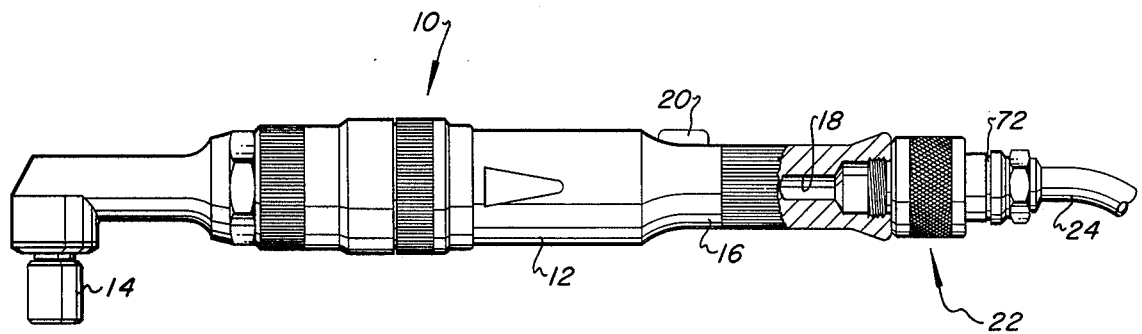
FIG. 1 is a side elevation view, partially sectioned, of a pressure fluid operated torque tool including the low pressure shutoff valve of the present invention.

Referring to FIG. 1 there is illustrated a fluid operated tool such as a nutsetter or the like, generally designated by the numeral 10. The tool 10 includes a housing 12 in which is disposed a conventional fluid operated motor and associated drive mechanism, not shown, for rotating a fastener driving element 14. The tool 10 also is characterized by a handle portion 16 having a motive fluid inlet passage 18 and an actuating member 20 for opening a throttling valve, not shown, disposed in the tool in a conventional manner. The tool 10 is exemplary of various well known apparatus for performing work such as screwdriving, nut tightening, and other operations wherein a maximum predetermined torque effort must be reached before motor shutoff occurs. As mentioned previously herein various devices are known in the art to torque tools which are responsive to the torque transmitted to the workpiece to effect motor shutoff thereby limiting the torque output of the tool and preventing a sustained torque reaction or excessive overtorque from being imposed on the tool operator person. The tool 10 may, of course, include one or more such devices. Since such devices as well as the construction of conventional fluid operated torque tools are well known, a detailed description of such structure will be omitted here in the interest of conciseness. Those skilled in the art of fluid operated torque tools will also recognize that tools equipped with torque responsive motor shutoff devices are at least somewhat responsive to the motive fluid supply pressure to assure that such devices function properly.

Figure 2:
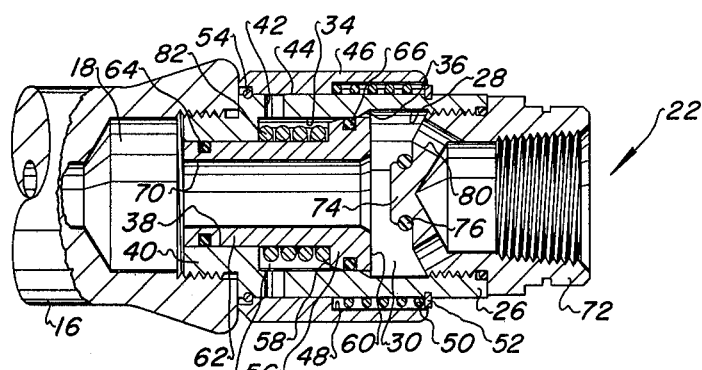
FIG. 2 is a longitudinal section view of the shutoff valve in the valve open position.

The tool 10 is provided with a low pressure shutoff valve 22 which is adapted to be connected to the tool 10 and interposed in the motive fluid supply conduit means comprising the passage 18 and a conventional flexible fluid conduit or hose 24 as shown in FIG. 1. Referring to FIG. 2 also, the valve 22 is characterized by a tubular body 26 having a bore 28 forming a first chamber 30. The body 26 also includes a second chamber 32 formed by a bore 34 of smaller diameter than the bore 28. The bores 28 and 34 are interconnected by an axially sloping wall portion 36. The body 26 further comprises a third bore 38 of smaller diameter than the bore 34 and which projects through an externally threaded portion 40 of the body. The body 26 further includes a plurality of transverse passages 42 which open from the chamber 32 to the outer cylindrical surface 44.

The passages 42 may be closed off by cylindrical sleeve 46 which is axially slidable on the exterior of the body 26. The sleeve 46 is proportioned to be in close fitting relationship with the outside surface 44 of the body 26 to substantially prevent leakage of pressure fluid from the chamber 32 to the exterior of the valve body when the chamber 32 is pressurized and the sleeve is in the position shown. The sleeve 46 includes a recess 48 for a coil spring 50. The spring 50 is held captive in the recess by a retaining ring 52 disposed on the body 26, and the spring thereby biases the sleeve 46 to cover the passages 42 as shown in the drawings. The sleeve is retained on the body 26 by a second retaining ring 54 disposed on the body in a conventional manner.

The shutoff valve 22 is further characterized by a closure member formed as a piston 56 having opposed transverse pressure surfaces 58 and 60 and a stem portion 62 which is slidably disposed in the bore 38. An O-ring type seal 64 is disposed on the outside diameter of the stem portion 62 for sealing engagement with the bore 38. An O-ring 66 is also disposed on the periphery of the piston 56 for sealing engagement with the bore 34 when the piston is in the position shown in FIG. 2. The piston 56 is further characterized by a longitudinal fluid outlet passage 70 opening to the passage 18 in the tool handle portion 16 and, in the position of the piston shown in FIG. 2, the passage 70 opens to the chamber 30.

The valve 22 is also characterized by a body member 72 threadedly engaged with the body 26 and including a transverse end portion 74 disposed within the chamber 30. The end portion 74 is formed to have a cylindrical axial projection which supports an O-ring seal 76 disposed thereon and forming a seat for sealingly closing off communication of the chamber 30 with the passage 70 when the piston 56 is biased into the position shown in FIG. 3. The body member 72 includes a bore 78 forming a fluid inlet passage, and passages 80 opening through the end portion 74 into the chamber 30. The bore 78 of the body member 72 is provided with a suitable threaded portion whereby it may be removably connected to the pressure fluid supply conduit 24 as shown in the drawing.

Figure 3:
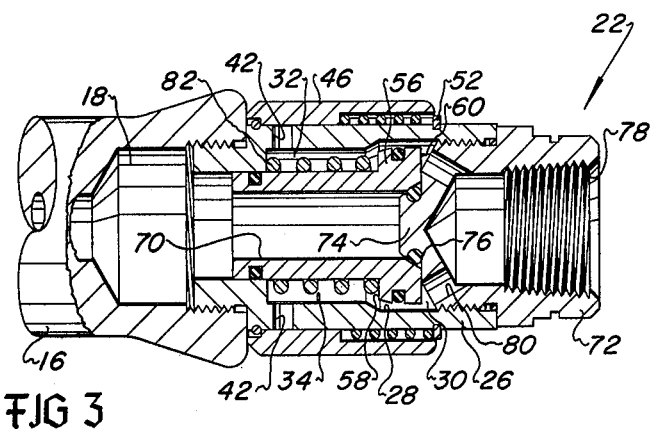
FIG. 3 is a view similar to FIG. 2 but showing the valve closed.

Referring particularly to FIG. 3 the piston 56 is biased to the position shown by a coil spring 82 disposed in the chamber 32 and around the stem portion 62. In the position shown in FIG. 3 the piston 56 is sealingly engaged with the portion 74 to shut off communication of pressure fluid from the chamber 30 to the passage 70. Moreover, with pressure fluid supplied through the conduit 24 and the passages 70 the chambers 30 and 32 will be pressurized so that a pressure force acting on surface 58 in addition to the force of springs 82 will be sufficient to oppose a pressure force acting on surface 60 and keep the piston 56 in the valve closed position.

The relative areas of the pressure surfaces 58 and 60 are selected, together with the force characteristics of the spring 82, so that at all pressures normally encountered in the conduit 24 the valve will remain in the closed or shutoff condition assuming that the valve was initially closed prior to introducing pressure fluid into the chambers 30 and 32. Accordingly, the valve 22 may also function as a self-sealing coupling member in circumstances where it is desired to remove the tool from the supply conduit for servicing or replacement without shutting off the main source of pressure fluid.

With the valve 22 connected to the tool 10 as shown in FIG. 1, the valve may be opened momentarily by retracting the sleeve 46 to uncover the passages 42 thereby venting the chamber 32. The fluid pressure in the chamber 32 will decrease rapidly due to the fact that the total flow area of the passages 42 is greater than the annular area formed between the piston 56 and the bore 28. Accordingly, the difference in pressure forces acting on the surfaces 58 and 60 will cause the piston 56 to move to the valve open condition as shown in FIG. 2 assuming that the pressure in the chamber 30 is sufficient to cause a pressure force acting on surface 60 great enough to overcome the bias force of the spring 82 as the piston moves into the bore 34.

With the piston sealingly engaged with the bore 34 and the chamber 32 at a reduced pressure from being vented by the retraction of the sleeve 46 the valve 22 will remain in the opening condition as long as the pressure force acting on the surface 60 is great enough to overcome the biasing force of the spring 82.

If the pressure in chamber 30 should decrease for any reason below a value sufficient to hold the piston 56 in the open condition the piston will move out of the bore 34 toward the body member 72 whereby pressure fluid will flow into the chamber 32 to act on the surface 58 to assist the spring 82 in rapidly closing the valve by engagement of the piston with the seat formed by the portion 74 and the O-ring 76. Such action will alert the tool operator to the fact that the supply pressure to the tool is shut off and is insufficient for proper operation of the tool itself. Moreover, the pressure fluid supply to the tool will remain shut off until the tool operator again retracts the sleeve 46 to cause the valve to reopen provided that the supply pressure is sufficient to overcome the biasing force of the spring 82.

An alternate embodiment of the shutoff valve of the present invention is shown in FIGS. 4 and 5 and is generally designated by the numeral 90. The shutoff valve 90 is characterized by a body 92 and body member 94 threadedly engaged with the body 92 in the same manner as the valve 22. The body member 94 includes inlet passage means 95 and 97 similar to the inlet passages formed in the body member 72 of the valve 22. The body 92 includes a bore 96 forming a chamber 98 and a bore 100 of smaller diameter than and coaxial with the bore 96. The body 92 also includes a cylindrical exterior surface 102 which is stepped and on which is slidably disposed a sleeve 104. The sleeve 104 is adapted to be in close fitting relationship with both portions of the stepped surface 102. The sleeve 104 also is sealingly engageable with O-ring seals 106 and 108 disposed in suitable grooves on the body 92.

The valve 90 also includes a piston type closure member 107 having opposed transverse pressure surfaces 109 and 111, and a stem portion 112 disposed in the bore 100. The piston 107 includes a fluid outlet passage 114 which is closed by engagement of the piston with a frustoconical seat surface 116 on the body member 94. O-ring seals 118 and 120 are disposed in suitable grooves on the circumference of the piston 107 and the stem portion 112, respectively.

The valve 90 further includes a tubular member 122 which is slidably disposed in the bore 96 in close fitting relationship thereto. An O-ring 124 disposed in a groove in the bore 96 forms a fluid seal with respect to the periphery of the member 122. The member 122 also includes a bore 126 for receiving the piston 107. The bore 126 is proportioned to receive the piston therein in fluid sealing relationship due to the O-ring seal 118. The member 122 is connected to the sleeve 104 by a threaded pin 128 whereby the member may be moved longitudinally in the bore 96 by manual actuation of the sleeve. A groove 130 is provided in the body 92 to provide clearance for the pin 128. A coil spring 132 is disposed around the stem portion 112 of the piston 107 and between the surface 109 and removable shims or spacers 134 which are disposed in a recess in the body 92 as shown in FIG. 4. The coil spring biases the piston 107 toward the position shown in FIG. 4.

The valve 90 is adapted to have greater flow area between the periphery of the piston 107 and the bore 96 than the corresponding flow area in the valve 22. The valve 90 does not rely on the pressure drop across the aforementioned flow area to create a resultant force acting on the piston 107 to move it one way or the other.

With the valve 90 connected to a pneumatic tool in a manner like that shown for the valve 22 the piston 107 will be in the position shown in FIG. 4. With pressure fluid supplied to the valve 90 by way of a suitable conduit the piston 107 will remain in the closed and fluid shutoff position shown for all fluid pressures which would likely be encountered in an industrial plant compressed air network. Accordingly, in order to cause the valve 90 to open, the sleeve 104 must be actuated by the tool operator to be moved to the right viewing FIG. 4, whereby the member 122 will sealingly engate the piston 107 to prevent communication between the chamber 98 and a chamber 136 formed between the member 122 and the stem portion 112. Concurrently, the chamber 136 is vented to the exterior of the valve by way of the groove 130 and the space between the inside wall surface of the sleeve 104 and the exterior surface of the body 92 provided that the sleeve has been moved out of contact with the O-ring seal 106.

With the venting of the chamber 136 and upon release of the sleeve 104 by the tool operator a resultant pressure force acting on the surface 111 of the piston will move the piston, member 122, and the sleeve to the position shown in FIG. 5 provided that the fluid pressure in the chamber 98 is sufficient to overcome the biasing force of the spring 132. The valve 90 will remain in the open position as long as the pressure of the fluid flowing through chamber 98 and the passage 114 is equal to or greater than that required to hold the piston 107 substantially in the position shown. The pressure which will hold the piston 107 in the open position may be predetermined by selection of the spring 132 and by the total space occupied by the removable spacers 134. The number of spacers 134 may be varied to predetermine the shutoff pressure of the valve 90.

If the fluid pressure should decrease below the predetermined minimum, the spring 132 will force the piston 107 out of the bore 126 toward the position of the piston shown in FIG. 4. The sleeve 104 and member 122 will remain in the position shown in FIGS. 4 and 5 due to a resultant pressure force acting on the transverse surface 123 and due to the frictional resistance of the seals 106, 108 and 124 normally being greater than the frictional resistance of the seal 118. As soon as fluid communication is established between chamber 98 and chamber 136 by movement of the piston 107 out of the bore 126, pressure fluid will act on the surface 109 to assist in rapidly moving the piston to the valve closed position shown in FIG. 4. The valve will remain in the closed position until it is reopened in the aforedescribed manner. The valve 90 will not reopen unless the fluid pressure in chamber 98 is sufficient to move the piston away from the surface 116. Moreover, the valve will not remain in the position shown in FIG. 5 unless the fluid pressure force acting on surface 111 is sufficient to hold the piston in the member 122 against the bias force of the spring 132.

The embodiments of the shutoff valve disclosed herein are particularly adapted to be connected to a variety of torque tools to thereby provide for tools fitted with torque responsive shutoff devices to be more reliable in operation and to minimize the chance of operator injury from sustained or unexpectedly high reactive torques exerted by the tool. Those skilled in the art will recognize that the valves may be modified in various ways to, for example, be built into the body of the tool proper without departing from the scope of the appended claims.

What is claimed is:

1. A minimum pressure shutoff valve for use with pneumatic tools and the like comprising:
   a body including a cylindrical outer surface, a first bore defining a first chamber and a second bore of smaller diameter than the first bore and defining a second chamber opening into said first chamber;
   a piston comprising a closure member of said valve supported within said body for sliding movement from said first chamber into said second chamber to form a closure between said first and second chambers, sai piston including first and second opposed pressure surfaces thereon;
   a fluid inlet passage in communication with said first chamber;
   a fluid outlet passage;
   a valve seat disposed on said body and engageable by said piston to close off fluid flow from said inlet passage to said outlet passage;
   passage means opening to said outer surface of said body for venting pressure fluid to the atmosphere exterior of said body from said second chamber; and,
   a tubular sleeve disposed on said body and normally blocking said passage means, said sleeve being manually actuatable at will to open said passage means to vent said second chamber whereby fluid pressure acting on said first pressure surface biases said piston to open said valve.

2. The invention set forth in claim 1 together with:
   resilient means for biasing said sleeve into a position blocking said passage means.

3. A minimum pressure shutoff valve for use with pneumatic tools and the like comprising:
   a body including a first bore defining a first chamber and a second bore of smaller diameter than the first bore and defining a second chamber opening into said first chamber;
   a piston comprising a closure member of said valve supported within said body for sliding movement from said first chamber into said second chamber to form a closure between said first and second chambers, said piston including first and second opposed pressure surfaces thereon;

a fluid inlet passage in communication with said first chamber;

a longitudinal fluid outlet passage formed in said piston opening through said first pressure surface and operable to be in communication with said first chamber in the valve open condition;

a valve seat disposed on said body and engageable by said piston to close off fluid flow from said inlet passage to said outlet passage;

passage means for venting pressure fluid to the atmosphere exterior of said body from said second chamber;

a member disposed on said body and normally blocking said passage means, said member being manually actuatable at will to open said passage means to vent said second chamber whereby fluid pressure acting on said first pressure surface biases said piston to open said valve; and, said first pressure surface on said piston is in communication with said first chamber and said second pressure surface on said piston is disposed to be in communication only with said second chamber when said piston forms a closure between said first and second chambers and said passage means is blocked by said member.

4. A minimum pressure shutoff valve for use with pneumatic tools and the like comprising:

a body including a bore defining a first chamber;

means defining a second chamber opening into said first chamber;

passage means for venting pressure fluid to the atmosphere exterior of said body from said second chamber;

a piston supported within said body for sliding movement from said first chamber into said second chamber to form a closure between said first and second chambers, said piston including first and second opposed pressure surfaces thereon;

a fluid inlet passage in communication with said first chamber;

a fluid outlet passage;

a valve seat disposed on said body and engageable by said piston to close off fluid flow from said inlet passage to said outlet passage;

a member disposed on said body and normally blocking said passage means, said member being manually actuatable at will to open said passage means to vent said second chamber whereby fluid pressure acting on said first pressure surface actuates said piston to open said valve, said first pressure surface being in communication with said first chamber and said second pressure surface being disposed to be in communication with only said second chamber when said piston forms a closure said first and second chambers and said passage means is blocked by said member;

spring means engaged with said piston for biasing said piston to the valve closed condition when the fluid pressure acting on said first pressure surface decreases to a predetermined minimum; and, removable spacer meand disposed in said body and engaged with said spring means for determining the minimum fluid pressure required to open said valve.

5. A minimum pressure shutoff valve for use with pneumatic tools and the like comprising:

a body including a bore defining a first chamber;

means defining a second chamber opening into said first chamber;

passage means for venting pressure fluid to the atmosphere exterior of said body from said second chamber;

a piston supported within said body for sliding movement from said first chamber into said second chamber to form a closure between said first and second chambers, said piston including first and second opposed pressure surfaces thereon;

a fluid inlet passage in communication with said first chamber;

a longitudinal fluid outlet passage formed in said piston opening through said first pressure surface and operable to be in communication with said first chamber in the valve open condition;

a valve seat disposed on said body and engageable by said piston to close off fluid flow from said inlet passage to said outlet passage; and, a member disposed on said body and normally blocking said passage means, said member being manually actuatable at will to open said passage means to vent said second chamber whereby fluid pressure acting on said first pressure surface actuates said piston to open said valve, said first pressure surface being in communication with said first chamber and said second pressure surface being disposed to be in communication with only said second chamber when said piston forms a closure between said first and second chambers and said passage means is blocked by said member.

6. A minimum pressure shutoff valve for use with pneumatic tools and the like comprising:

a body including a cylindrical outer surface and a bore defining a first chamber;

means defining a second chamber opening into said first chamber;

a piston supported within said body for sliding movement from said first chamber into said second chamber to form a closure between said first and second chambers, said piston including first and second opposed pressure surfaces thereon;

a fluid inlet passage in communication with said first chamber;

a fluid outlet passage;

a valve seat disposed on said body and engageable by said piston to close off fluid flow from said inlet passage to said outlet passage;

passage means opening to said outer surface for venting pressure fluid to the atmosphere exterior of said body from said second chamber; and, a sleeve disposed on said body around said outer surface and normally blocking said passage means, said sleeve being manually actuatable at will to open said passage means to vent said second chamber whereby fluid pressure acting on said first pressure surface actuates said piston to open said valve.

7. The invention set forth in claim 6 wherein:

said means defining said second chamber includes a tubular member slidably disposed in said bore for engagement with said piston so that said piston forms a closure between said first and second chambers.

8. The invention set forth in claim 7 wherein:

said tubular member and said sleeve are interconnected and said sleeve is movable to open said passage means and move said tubular member to engage said piston to form a closure between said first and second chambers.

* * * * *